US010202050B2

(12) United States Patent
Kubo et al.

(10) Patent No.: US 10,202,050 B2
(45) Date of Patent: Feb. 12, 2019

(54) POWER RAIL-SUPPORT UNIT AND GUIDE-TRACK TRANSPORTATION SYSTEM

(71) Applicant: MITSUBISHI HEAVY INDUSTRIES ENGINEERING, LTD., Kanagawa (JP)

(72) Inventors: Akihiro Kubo, Tokyo (JP); Kosaku Murase, Tokyo (JP); Eisuke Okano, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 106 days.

(21) Appl. No.: 15/120,501

(22) PCT Filed: Feb. 17, 2015

(86) PCT No.: PCT/JP2015/054247
§ 371 (c)(1),
(2) Date: Aug. 19, 2016

(87) PCT Pub. No.: WO2015/129511
PCT Pub. Date: Sep. 3, 2015

(65) Prior Publication Data
US 2017/0015214 A1    Jan. 19, 2017

(30) Foreign Application Priority Data

Feb. 28, 2014 (JP) .................................. 2014-038150

(51) Int. Cl.
*B60M 1/30* (2006.01)
*B60L 5/39* (2006.01)

(52) U.S. Cl.
CPC ................ *B60M 1/307* (2013.01); *B60L 5/39* (2013.01)

(58) Field of Classification Search
CPC . B60M 1/00; B60M 1/02; B60M 1/12; B60M 1/22; B60M 1/30; B60M 1/307
See application file for complete search history.

(56) References Cited

FOREIGN PATENT DOCUMENTS

| CN | 2925957 Y | 7/2007 |
| CN | 201231693 Y | 5/2009 |
| JP | 60-222334 A | 11/1985 |
| JP | S 60222334 | * 11/1985 .............. B60M 1/12 |

(Continued)

OTHER PUBLICATIONS

International Search Report in PCT/JP2015/054247, dated Apr. 28, 2015.
Written Opinion in PCT/JP2015/054247, dated Apr. 28, 2015.

*Primary Examiner* — Robert J McCarry, Jr.
(74) *Attorney, Agent, or Firm* — Kanesaka Berner and Partners LLP

(57) ABSTRACT

A power rail-support unit includes: a base portion that is integrally fixed on a track; a guide rail on which a guide wheel of a side portion of a vehicle travelling on the track abuts; a first fixing portion that is configured to fix the guide rail on the base portion; a second fixing portion that is connected to the guide rail so as to be independent of the first fixing portion; a bracket that is supported on the guide rail; and a power rail that is supported by the bracket so as to be arranged at a predetermined relative position relative to the guide rail, and that slides on and makes contact with a collector of the vehicle.

7 Claims, 9 Drawing Sheets

(56) References Cited

FOREIGN PATENT DOCUMENTS

| | | | |
|---|---|---|---|
| JP | 62-1648 | A | 1/1987 |
| JP | 63-251339 | A | 10/1988 |
| JP | 6-887 | U | 1/1994 |
| JP | 2001-171394 | A | 6/2001 |
| JP | 2005-231484 | A | 9/2005 |

* cited by examiner

POWER RAIL-SUPPORT UNIT AND GUIDE-TRACK TRANSPORTATION SYSTEM

RELATED APPLICATIONS

The present application is a National Phase of PCT/JP2015/054247, filed Feb. 28, 2015, and claims priority based on Japanese Patent Application No. 2014-038150, filed Feb. 28, 2014.

TECHNICAL FIELD

The present invention relates to a power rail-support unit and a guide-track transportation system provided therewith.

BACKGROUND ART

A guide-track transportation system using a guide-track vehicle has been attracting attention as a new transportation system. A vehicle that is adopted as this guide-track transportation system includes, for example, a collector provided on a side-surface part of the vehicle, and a guide wheel provided side by side with the collector. On a guide track on which a guide-track vehicle travels, a power rail for supplying electricity to the vehicle via the collector of the vehicle, and a guide rail that guides a travelling direction of the vehicle and abuts on the guide wheel of the vehicle are provided. A relative positional relationship between the power rail and the guide rail is necessary to correspond to a relative positional relationship between the collector and the guide wheel of the vehicle. That is, it is necessary to be in a positional relationship such that the power rail abuts on the collector and the guide wheel abuts on the guide rail. Therefore, when laying the guide track, a support unit and a construction method that are capable of managing the relative positional relationship between the power rail and the guide rail in high accuracy are required.

As such a support unit, an installation structure disclosed in Patent Document 1 is known. This installation structure has a structure in which an embedded plate is partly embedded in a side wall of a travelling track for the vehicle at substantially a right angle, an installation plate is tightened by a bolt on the embedded plate through an elongated hole formed in the embedded plate, and a guide rail is fixed on the installation plate by a clip. Furthermore, the installation structure has a structure in which an insulator-attached plate on which a power rail is attached via an insulator is tightened by the bolt on the installation plate through the elongated hole provided in the installation plate.

PRIOR ART DOCUMENTS

Patent Documents

[Patent Document 1] Japanese Unexamined Patent Application, First Publication No. 2005-231484

DISCLOSURE OF THE INVENTION

Problems to be Solved by the Invention

However, the installation structure of Patent Document 1 is necessary to individually install the guide rail and the insulator-attached plate provided on the power rail on the installation plate after the installation plate is installed in the embedded plate. In other words, it is necessary to carry out a position adjustment of the guide rail and the insulator-attached plate individually.

Furthermore, when a positional adjustment for only the guide rail is carried out, or when a positional adjustment for only the insulator-attached plate is carried out, the relative positional relationship between the guide rail and the insulator-attached plate has a possibility of deviating from a predetermined criteria. Therefore, management of the construction accuracy becomes difficult and there is a possibility to increase construction man-hours.

The present invention is provided to solve the above problems, and provides a power rail-support unit that is capable of maintaining high construction accuracy whilst reducing construction costs, and a guide-track transportation system provided with this support unit.

Means for Solving the Problem

The following means is suggested as the support unit, track, and guide-track transportation system of the present invention in order to solve the above problems.

A first aspect of the present invention provides a support unit that includes: a base portion that is integrally fixed on a track; a guide rail on which a guide wheel of a side portion of a vehicle travelling on the track abuts; a first fixing portion that is configured to fix the guide rail on the base portion; a second fixing portion that is connected to the guide rail so as to be independent of the first fixing portion; a bracket that is supported on the guide rail; and a power rail that is supported by the bracket so as to be arranged at a predetermined relative position relative to the guide rail, and slides on and makes contact with a collector of the vehicle.

According to this configuration, when mounting the guide rail on the base portion, the guide rail and the power rail can be fixed at a predetermined relative position. In other words, at the same time as the position of the guide rail is determined by mounting the guide rail on the base portion, the positions of the bracket and the power rail which is supported by the bracket are determined. Accordingly, it is possible to lay the guide track with high accuracy and to reduce the construction man-hours.

Further, even when the positional adjustment of the guide rail relative to the base portion is performed, the position of the power rail in which the relative position relative to the guide rail is fixed so as to follow the guide rail is adjusted simultaneously. That is, it is possible to maintain the relative positional relationship of the power rail with respect to the guide rail, and therefore, it is possible to lay the guide track with high accuracy and to reduce the construction man-hours.

Further, a second aspect of the present invention provides the support unit according to the first aspect, the relative position of the power rail with respect to the guide rail being determined based on the positional relationship between the guide wheel and the power rail of the vehicle.

According to this configuration, it is possible to obtain a positional relationship between the guide rail and the power rail corresponding to the relative position of the guide wheel and the collector of the vehicle, by merely determining the position of the guide rail.

Further, a third aspect of the present invention provides the support unit according to the first or second aspects, the bracket having a cable support portion that supports a cable.

According to this configuration, the cable is supported by the bracket, and thereby, it is possible to reduce man-hours and cost of ancillary facilities for accommodating the cable. That is, it is possible to reduce man-hours for laying the guide track.

Further, a fourth aspect of the present invention provides the support unit according to the first or third aspects, the bracket and an insulator being integrally formed of an insulating support.

According to this configuration, the work of fixing the insulator to the bracket is eliminated, and thereby, it is possible to reduce the construction man-hours. In addition, since the number of parts is reduced, it is possible to reduce costs for quality control, inventory management, and so on.

Further, a fifth aspect of the present invention provides the support unit according to the any one of the above aspects, the guide rail including: a first flange that is fixed on the base portion by the first fixing portion; a second flange that is disposed so as to face the first flange and on which the guide wheel is in contact; and a connecting portion that connects the first flange and the second flange between the first flange and the second flange, the bracket including: a fixed portion that is fixed to the connecting portion by the second fixing portion, and an extending portion that extends in a direction away from the connecting portion from the portion of the second flange side of the fixed portion.

According to this configuration, since the extending portion is provided at the portion of the second flange side of the fixed portion, the first fixing portion provided on the first flange side of the guide rail and the extending portion of the guide rail do not interfere with each other. Thus, it is possible to dispose the first fixing portion and the extension portion of the support unit without shifting them in a track-travelling direction, and it becomes easy to carry out the replacement work at existing lines that have already been in operation.

Further, a sixth aspect of the present invention provides the support unit according to the any one of the above aspects, the second fixing portion being configured to be capable of adjusting the fixing portion of the bracket relative to the guide rail so as to be capable of finely adjusting the fixing portion of the power rail from the relative position.

According to this configuration, even when a changing request of a relative position of the power rail relative to the guide rail from the initial-defined position occurs, it is possible to easily accommodate this change by adjusting the fixing position of the bracket relative to the guide rail. Accordingly, it is possible to reduce maintenance costs and man-hours after laying the guide rail.

Further, a seventh aspect of the present invention provides the support unit according to the any one of the above aspects, a spacer being provided that is configured to finely adjust the fixing portion of the power rail from the relative position by being interposed between the guide rail and the bracket.

According to this configuration, it is possible to finely adjust the fixing position of the power rail from the relative position by merely providing a spacer. Accordingly, it possible to reduce maintenance costs and man-hours after laying the guide track. In addition, it is possible to maintain high construction accuracy.

Furthermore, according to an eighth aspect of the present invention, a guide-track transportation system includes: a guide track provided with the power rail-support unit according to the any one of the above aspects; and a vehicle.

Effects of the Invention

The power rail-support unit and a guide-track transportation system of the present invention can maintain high construction accuracy and can reduce construction man-hours.

EMBODIMENTS OF THE INVENTION

First Embodiment

Hereinafter, a first embodiment of a support unit 1 and a guide-track transportation system T according to the present invention will be explained with reference to FIG. 1 and FIG. 2.

Figure 1:
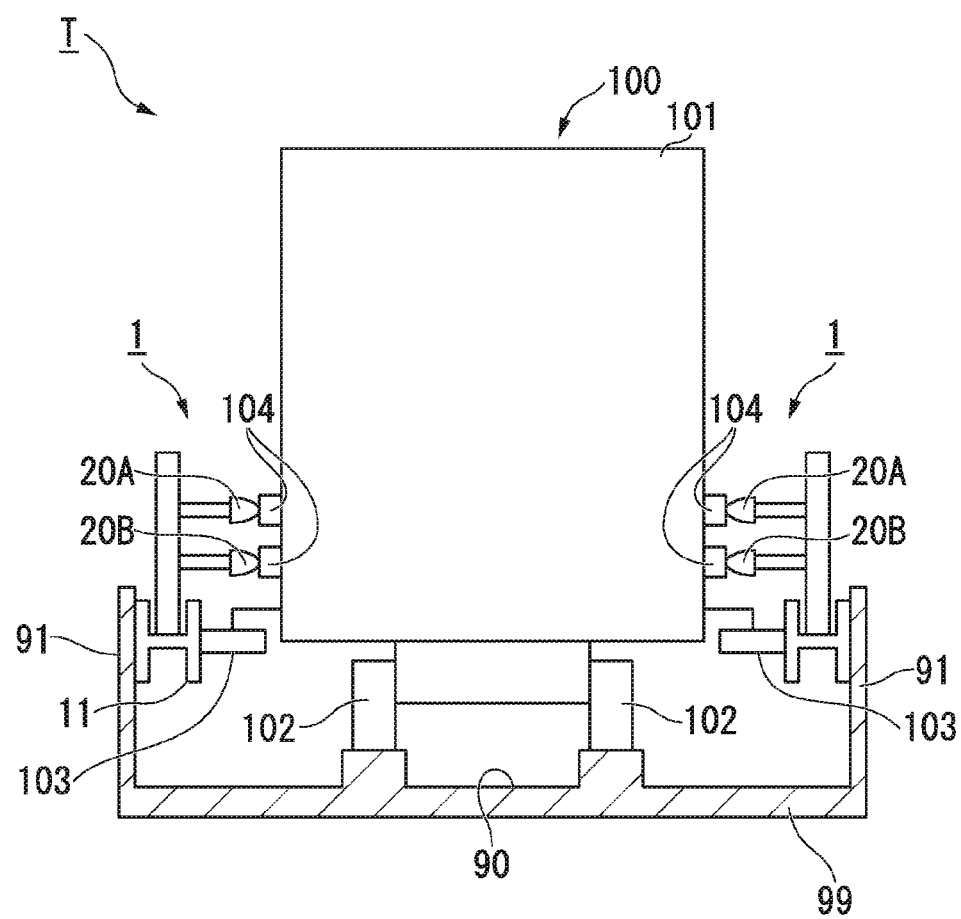
FIG. 1 is a cross-sectional view showing an overview of a vehicle of a guide-track transportation system and a support unit according to the present invention.

FIG. 1 is a cross-sectional view in which an overview of the guide-track transportation system T according to the present invention is viewed from a travelling direction of a vehicle 100.

<Guide-Track Transportation System>

As shown in FIG. 1, the guide-track transportation system T includes the vehicle 100 that carries people or cargo and transports them, a guide track 99 on which the vehicle 100 travels, and the support unit 1 installed on the guide track 99.

<Vehicle and Guide Track>

The vehicle 100 includes a vehicle main body 101 having a box shape, wheels 102 for travelling that are provided at a lower part of the vehicle main body 101, guide wheels 103 that are provided on both side-surface parts of the vehicle main body 101, and collectors 104 arranged in parallel in a vertical direction with respect to the guide wheels 103.

The vehicle main body 101 is a structure having a box shape when viewed from the exterior thereof and having a cavity inside thereof; an opening and closing door, window, and the like (not shown), are provided on the side-surface part thereof; and a pair of wheels 102 located right and left is provided on a lower surface part thereof. The wheels 102 rotate by being driven by the power output unit (not shown). For example, rubber tires are used as the wheels 102.

The guide wheels 103 are supported on both side-surface parts of the vehicle 100 and are rotatable about a vertical rotational axis. The guide wheels 103 are provided at substantially the same height position as a guide rail 11 supported by a support unit 1 to be described later. Therefore, when the vehicle 100 is travelling, the guide wheels 103 abut on the guide rail 11 and rotate.

The collector 104 is a member that is provided above the above-described guide wheel 103. In the present embodiment, a pair of collectors 104 is arranged in parallel in a vertical direction. The collectors 104 are provided at substantially the same height as power rails 20 which are supported by the support unit 1. When the vehicle 100 is travelling, the collectors 104 slide on and make contact with the power rails 20 to be described later. The collectors 104 and the power rails 20 are fabricated of a material having conductivity. Therefore, power supplied from the power rails 20 is supplied to the collectors 104 by the collectors 104 sliding and making contact with the power rails 20. This power is supplied to the power output unit of the vehicle 100, and the wheels 102 rotate by being driven by the power output unit. Consequently, the vehicle 100 can travel on the guide track 99 to be described later.

The guide track 99 includes a track road surface 90 provided substantially horizontally, and the base portion 91 that is a side wall extending toward a substantially upward direction from both ends of the track road surface 90. The track road surface 90 and the base portion 91 are constructed integrally of, for example, concrete. The guide track 99 extends along a predetermined route, and in the middle of the route, there are straight sections and curved sections as required. The vehicle 100 travels on these straight sections and curved sections on the track road surface 90 by being guided in the travel direction by the guide rail 11 to be described later.

<Support Unit>

The support unit 1 is a structure that has a column shape when viewed from the exterior thereof and is installed with respect to the base portion 91 of the guide track 99. More specifically, as shown in FIG. 2, the support unit 1 includes a guide rail 11 having an H-shape in a cross-sectional view, a bracket 12 that has an L-shape in a cross-sectional view and that is connected with the guide rail 11, and an insulating support 21 that is fixed and supported at a midway part of the bracket 12 that extends.

The guide rail 11 includes a first flange 11A extending in the vertical direction and having a thin plate shape, a second flange 11B arranged so as to face and be parallel to the first flange 11A and having a thin plate shape as well, and a connecting portion 11C connecting the first flange 11A and the second flange 11B. More specifically, the connecting portion 11C connects a middle position of the first flange 11A in the vertical direction and a middle position of the second flange 11B in the vertical direction. Moreover, the connecting portion 11C is provided so as to be perpendicular to the first flange 11A and to the second flange 11B. That is, the guide rail 11 is a member having an H-shape in a cross-sectional view when viewed from the travel direction of the vehicle 100. The guide rail 11 is provided over the total length of the guided track 99.

Furthermore, the guide rail 11 is fixed on the base portion 91 of the guide track 99 by a first fixing portion 17. More specifically, the first flange 11A of the guide rail 11 is fixed by the first fixing portion 17. The first fixing portion 17 includes a locking portion 61 and a locking bolt 62. The locking portion 61 is formed in a band plate shape, for example, like a construction clip, and is a member formed of a metallic material having rigidity. One end of the locking portion 61 is fastened to the base portion 91 by the locking bolt 62. Each of the edges of the first flange 11A in the vertical direction, the first flange 11A having a thin plate shape, is sandwiched between the other end of the locking portion 61 and the base portion 91. That is, a surface of the first flange 11A that is opposite to a surface facing the second flange 11B abuts a surface of the base portion 91. Here, since the locking portion 61 has rigidity, an end portion of the first flange 11A is pressed toward the base portion 91 by the other end of the locking portion 61. The first fixing portion 17 is provided as a pair above and below the first flange 11A of the guide rail 11. With the above configuration, the guide rail 11 is held so as to be incapable of falling off by the first fixing portion 17.

<Bracket>

The bracket 12 is a columnar-shaped member extending in the vertical direction, and the shape thereof has an L-shape in the cross-section that is orthogonal to a line in a direction in which the bracket extends. The lower end of the bracket 12 is a fixed portion 12B (base plate 12B) forming a planar shape along a horizontal plane. The fixed portion 12B has a through-hole into which a bolt 14 to be described later is inserted. Here, the size of the through-hole, the number thereof, and arrangement thereof, correspond respectively with the through-holes provided in the above-described connecting portion 11C.

Figure 2:
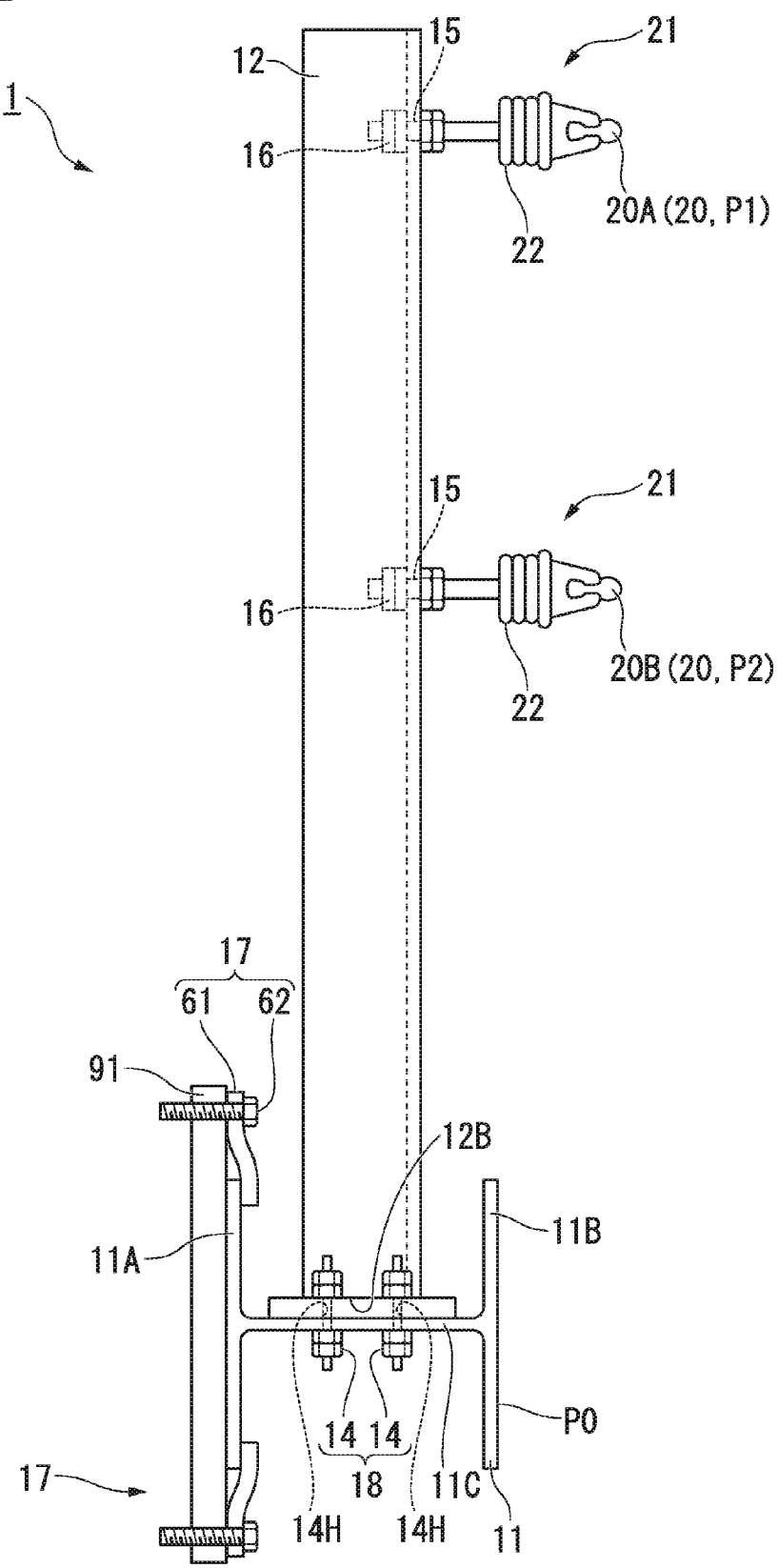
FIG. 2 is a front view of a support unit according to a first embodiment of the present invention.

That is, as shown in FIG. 2, when a connecting portion 11C and the bracket 12 are arranged in parallel in the vertical direction, more than one second fixing portion-through-hole 14H is formed by matching all the through-holes provided in each of the members, and each second fixing portion-through-hole is formed as one hole by which the matched through-holes are in communication. The bolt 14 is inserted in each of the second fixing portion-through-holes 14H, and both ends of the bolt 14 are fastened and fixed by a nut. That is, the second fixing portion 18 is formed of a plurality of second fixing portion-through-holes 14H and the bolts 14.

In the midway part of the bracket 12 that extends in the height direction, a pair of insulating supports 21 is provided at a distance from each other in a vertical direction. Further, the insulating support 21 is provided along the direction orthogonal to the height direction of the bracket 12, and is provided in the direction opposite to the side where the base portion 91 is located.

The insulating support 21 is a rod-like member made of a member having insulating properties. The insulating support 21 is inserted into a fixing hole 15 provided in the bracket 12, and one end of the insulating support is fixed and supported by the fixing member 16 such as a bolt clamp.

In the other end of the insulating support 21, an insulator 22 is provided. The insulator 22 is a known insulating material, the size and rating being appropriately selected depending on the design.

The power rail 20 is fixed to the tip portion of the insulator 22. The power rail 20 extends at the same height along the travelling direction of the vehicle 100, as is the same with the guide rail 11. Here, in the present embodiment, two power rails 20 are provided in the midway part of the bracket 12. The power rail 20 located above in the height direction of the bracket 12 is defined as the first power rail 20A, and the power rail 20 located below the first power rail 20A is defined as the second power rail 20B.

A first power rail 20A and the second power rail 20B are installed by being fixed to the insulators 22 provided at the tip of the insulating support 21, after the support unit 1 and the insulating support 21 are fixed to the base portion 91. Further, the first power rail 20A and the second power rail 20B are provided so as to be substantially parallel to each other over the total length.

Here, a position of the second flange 11B of the guide rail 11 described above is defined as the reference position P0. More specifically, the reference position P0 is a point on a surface of the second flange 11B, the surface of the second flange being an opposite side of a side in which the first flange 11A faces, and it indicates the position which is determined only by the lateral direction and height direction of the vehicle 100 on the two-dimensional coordinate plane. Similarly, the positions in the height direction and lateral direction of the first power rail 20A and the second power rail 20B are respectively defined as the first position P1 and the second position P2.

At this time, the relative position representing each arrangement relationship of the first position P1 and the second position P2 that are relative to the reference position P0 is a predetermined position by a relationship between the collector 104 and the guide wheel 103 that are provided of the vehicle 100. In other words, at the stage of fixing the guide rail 11 on the base portion 91, the position in which the insulating supports 21 on the bracket 12 are located is predetermined in such a manner that the tip portion of each insulator 22 described above is located at the first position P1 and the second position P2.

As described above, in this embodiment, the first fixing portion 17 configured to fix the guide rail 11 on the base portion 91, and the second fixing portion 18 configured to fix the bracket 12 on the guide rail 11 are provided independently of each other. Thus, by adjusting the first fixing portion 17, even when the reference position P0 of the guide rail 11 is changed, it is possible to maintain the relative position between a first position P1 that is the position of the first power rail 20A and the second position P2 that is the position of the second power rail 20B with respect to the reference position P0. In other words, when only the reference position P0 of the guide rail 11 is determined, the first position P1 of the first power rail 20A and the second position P2 of the second power rail 20B are uniquely determined by following thereto.

As a result, during the construction of the support unit 1, the position of the guide rail 11, the position of the first power rail 20A, and the position of the second power rail 20B do not need to be separately adjusted and determined. Accordingly, it is possible to carry out the construction of the guide track 99 with high accuracy and to reduce the construction man-hours.

Furthermore, since the relative position of the first power rail 20A and the relative position of the second power rail 20B that are relative to the guide rail 11 are fixed, for example, even when positional adjustment of the guide rail 11 is performed, the positions of the first power rail 20A the second power rail 20B that are supported by the bracket 12 so as to follow the guide rail 11 are adjusted simultaneously.

Here, for example, when both the guide rail 11 and the bracket 12 are fixed on the base portion 91 by the first fixing portion 17, if the first fixing portion 17 is handled in order to adjust the position of the guide rail 11 relative to the base portion 91, the relative position between the guide rail 11 and the bracket 12 is varied at the same time. Therefore, it is necessary to perform the position adjustment of the guide rail 11 and the bracket 12 again.

In contrast, in the present embodiment, the bracket 12 is not fixed to the base portion 91 together with the guide rail 11. The fixing of the bracket 12 on the base portion 91 is independent with respect to the fixing of the guide rail 11 on the base portion 91, and the bracket is substantially directly fixed to the guide rail 11. Therefore, the positional relationship between the guide rail 11 and the bracket 12 by the position adjustment of the guide rail 11 relative to the base portion 91 never changes.

That is, it is possible to maintain the relative positional relationship between the guide rail 11 and the first power rail 20A and between the guide rail and the second power rail 20B; and therefore, it is not necessary to separately adjust the position of the guide rail 11 and the first power rail 20A and the position of the guide rail and the second power rail 20B, and it is possible to reduce the construction man-hours.

The relative position of the above-described guide rail 11 and the power rails 20 is predetermined by the arrangement relationship between the guide wheel 103 and the collectors 104 of the vehicle 100. Therefore, by merely determining the position of the guide rail 11, the positions of the first power rail 20A and the second power rail 20B are uniquely determined.

Thus, by merely determining the position of the guide rail 11, the guide wheel 103 of the vehicle 100 is brought into contact with the guide rail 11, and the collectors 104 of the vehicle 100 can respectively slide on and make contact with the first power rail 20A and the second power rail 20B.

Furthermore, the support unit 1 according to the present embodiment includes an insulating support 21 which has an insulator 22 and is fixed to the bracket 12, and the power rails 20 are fixed to and supported by the bracket 12 via the insulating support 21.

Thereby, since the power rails 20 are fixed and supported by the bracket 12, it is not necessary to adjust the positional relationship of the power rails 20 relative to the bracket 12 during construction. In addition, it is possible to suppress the occurrence of a gap in the positional relationship between the power rails 20 and the guide rail 11. As a result, it is possible to maintain high construction accuracy at the time of laying the guide track 99 and to reduce the construction man-hours.

Second Embodiment

Next, a second embodiment of the present invention will be explained with reference to FIG. 3. In addition, with respect to the same configurations as in the first embodiment, the same reference numerals are used and detailed explanations thereof are omitted.

Figure 3:
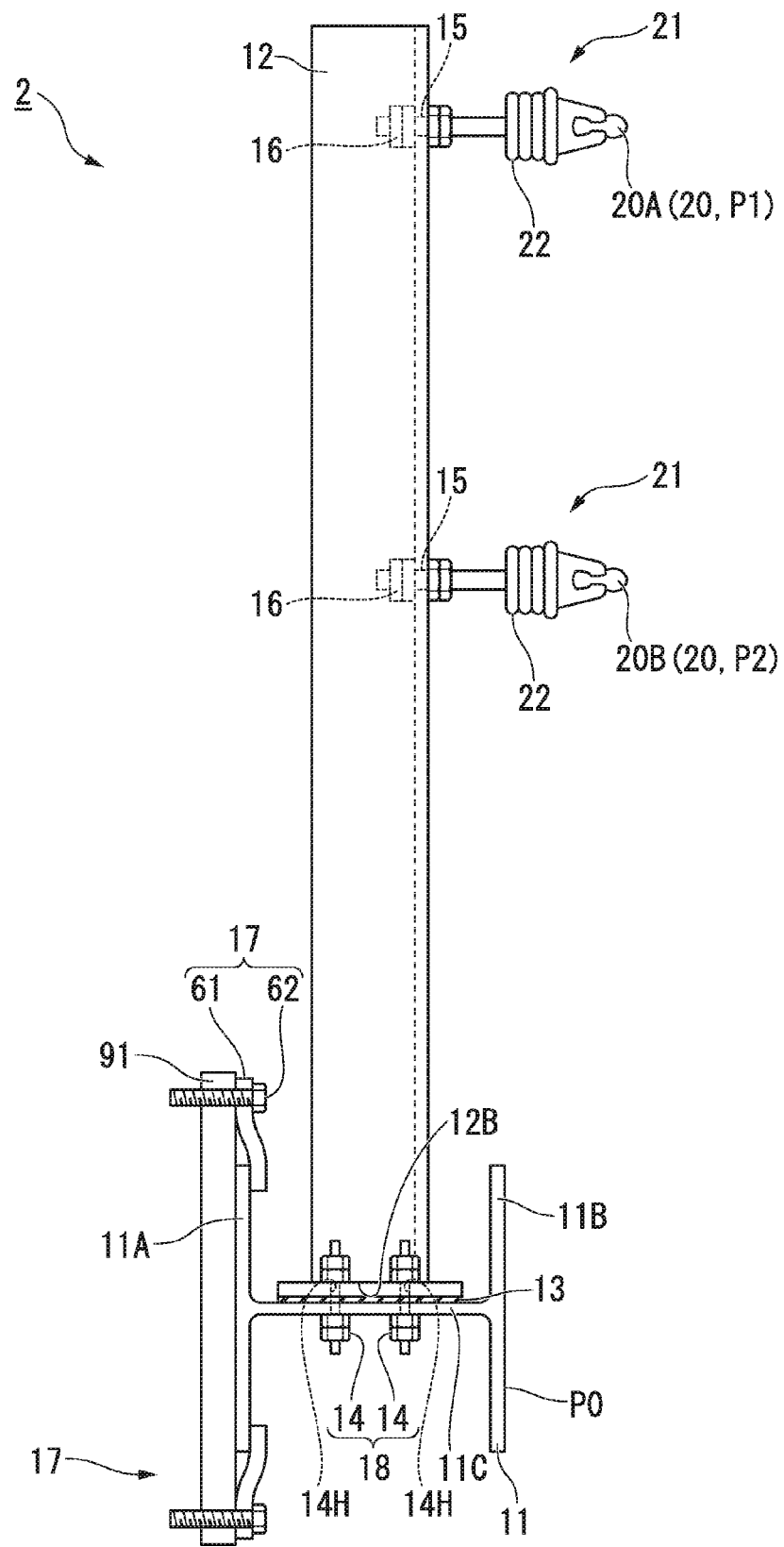
FIG. 3 is a front view of a support unit according to a second embodiment of the present invention.

FIG. 3 is a front view of the support unit 2 according to the present embodiment. As shown in FIG. 3, in the support unit 2 according to the present embodiment, a spacer 13 is provided between a guide rail 11 and a bracket 12.

In more detail, the spacer 13 is interposed between a fixed portion 12B of the bracket 12 and a connecting portion 11C of the guide rail 11. The spacer 13 is a member having a plate shape and is formed of, for example, concrete or metal. The spacer 13 has a through-hole, the size of which, the number of which, and the arrangement of which correspond to a through-hole provided in the aforementioned connecting portion 11C and a through-hole provided in the fixed portion 12B of the bracket 12.

As shown in FIG. 3, when the connecting portion 11C, the spacer 13, and the bracket 12 are arranged in parallel in the vertical direction, more than one second fixing portion-through-hole 14H is formed by matching all the through-holes provided in each of the members, and each second fixing portion-through-hole is formed as one hole by which the matched through-holes are in communication. The bolt 14 is inserted in each of the second fixing portion-through-holes 14H, and both ends of the bolt 14 are fastened and fixed by a nut. That is, the second fixing portion 18 is formed of a plurality of second fixing portion-through-holes 14H and the bolts 14.

Thus, in the present embodiment, the spacer 13 is provided between the guide rail 11 and the bracket 12. Therefore, even when a changing request of a relative position of the power rails 20 relative to the guide rail 11 occurs from the initial-defined position, it is possible to easily accommodate this change by appropriately selecting the size in a thickness direction of the spacer 13. Accordingly, it is possible to reduce maintenance costs and man-hours after laying the guide rail 99.

Third Embodiment

Next, a third embodiment of the present invention will be explained with reference to FIG. 4. In addition, with respect to the same configurations as in each of the above-described embodiments, the same reference numerals are used and detailed explanations thereof are omitted.

Figure 4:
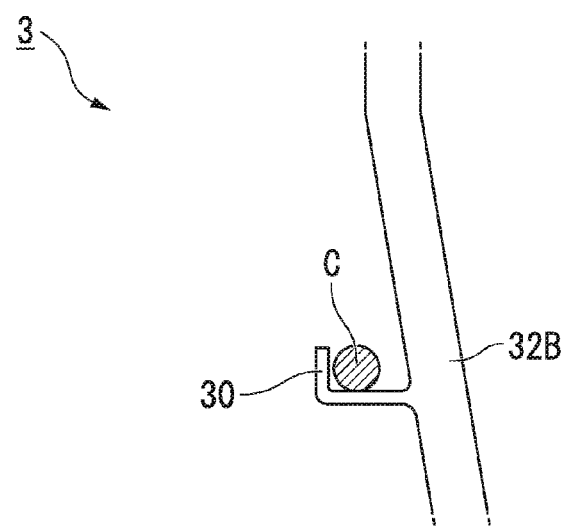
FIG. 4 is a front view of a support unit according to a third embodiment of the present invention.

FIG. 4 is a front view of a support unit 3 according to the present embodiment. As shown in FIG. 4, in the support unit 3 according to the present embodiment, a cable support 30 is provided on a bracket 32.

The cable support 30 is a member formed into a substantially L-shape by bending a thin plate, and one end of which is integrally connected at the midway of the bracket 32. The other end of the cable support that is on the opposite side of the one end that is on the side connected to the bracket 32 is bent substantially vertically upward. Accordingly, as shown in FIG. 4, it is possible to suspend a cable C in a region between the other end of the cable support 30 and the side surface of the bracket 32. In other words, the cable C is suspended so as to be perpendicular to the cable support 30 when viewed from above.

In this manner, the cable C is supported by the bracket 32, and thereby, it is possible to reduce man-hours and cost of ancillary facilities for accommodating the cables C. That is, it is possible to reduce man-hours for laying the guide track 99.

Fourth Embodiment

Figure 5:
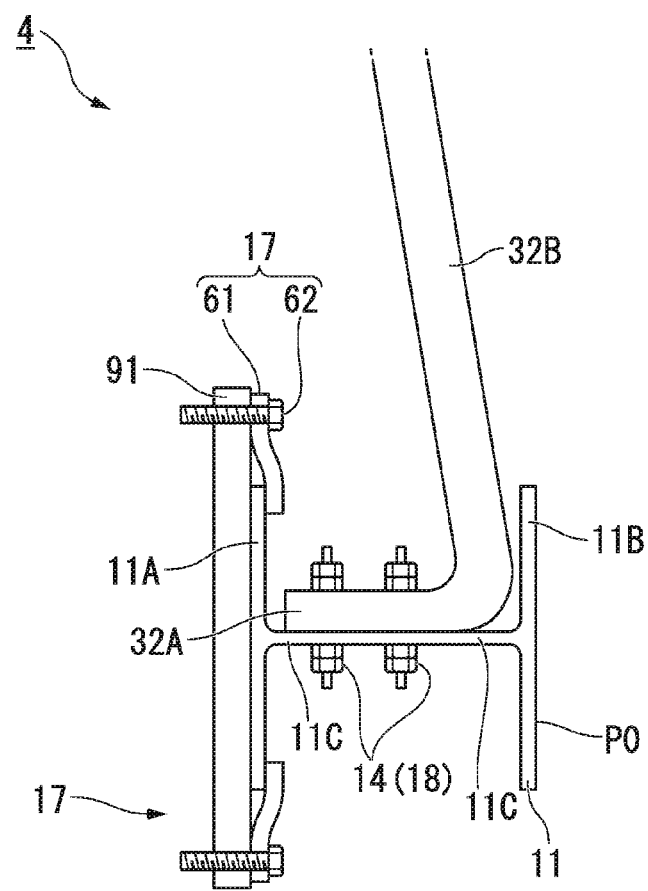
FIG. 5 is a front view of a support unit according to a fourth embodiment of the present invention.

Next, a fourth embodiment of the present invention will be explained with reference to FIG. 5. In addition, with respect to the same configurations as in each of the above-described embodiments, the same reference numerals are used and detailed explanations thereof are omitted.

In the present embodiment, a support unit 4 includes an extension portion 32B extending obliquely in a direction away from a connecting portion 11C from the portion of a second flange 11B side of a fixed portion 32A of a bracket 32.

Since the extending portion 32B is provided at the portion of the second flange 11B side of the fixed portion 32A, a first fixing portion 17 provided on a first flange 11A side of a guide rail 11 and the extending portion 32B of the bracket 32 do not interfere with each other. More specifically, it is possible to provide a locked portion 61 of the first fixing portion 17 without interference with the bracket 32. Accordingly, it possible to easily fix the guide rail 11 on a base portion 91; and therefore, it is possible to reduce construction man-hours.

Fifth Embodiment

Next, a fifth embodiment of the present invention will be explained with reference to FIG. 6. In addition, with respect to the same configurations as in each of the above-described embodiments, the same reference numerals are used and detailed explanations thereof are omitted.

Figure 6:
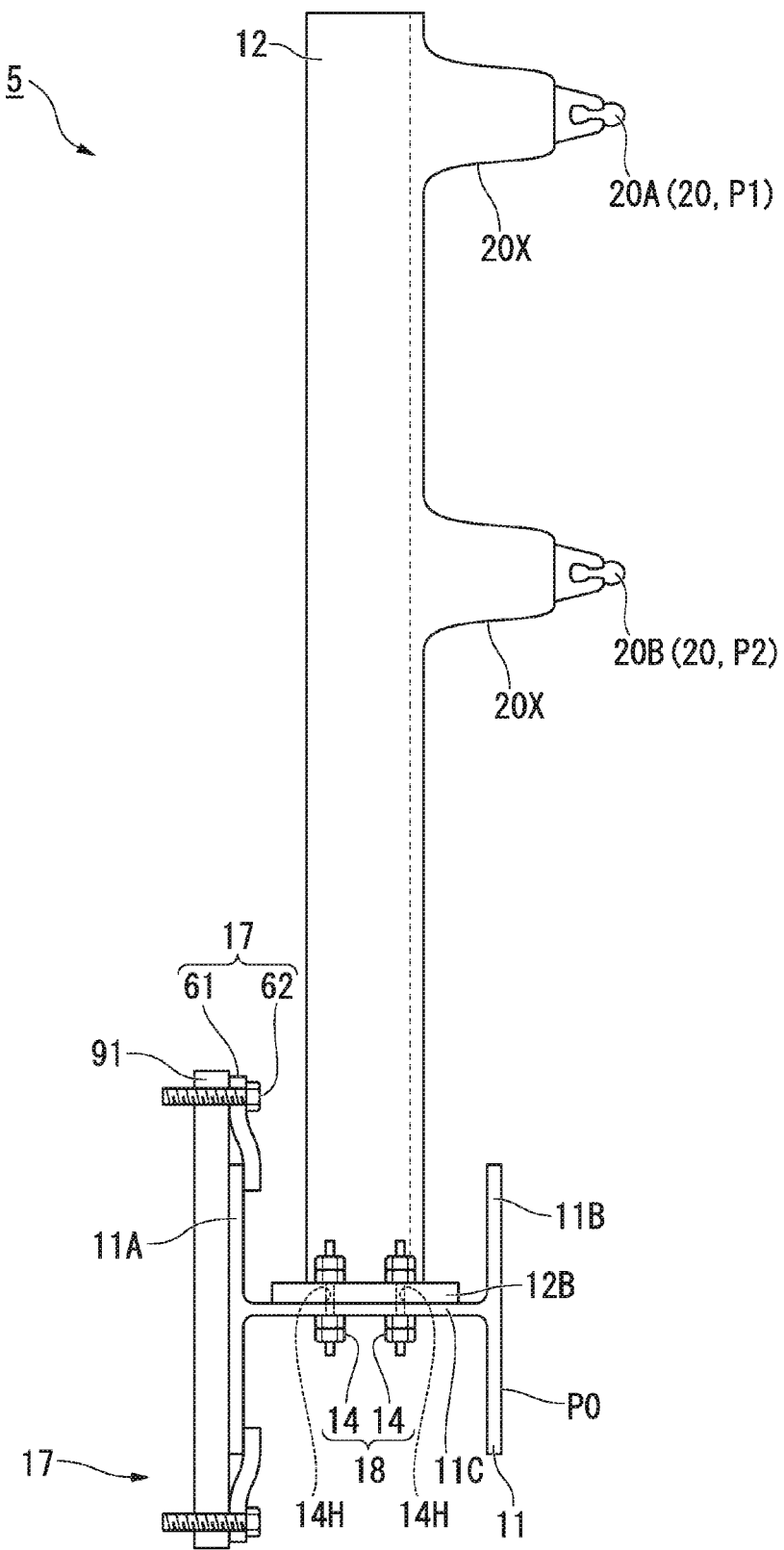
FIG. 6 is a front view of a support unit according to a fifth embodiment of the present invention.

FIG. 6 is an enlarged view of a support unit 5 according to the present embodiment. As shown in FIG. 6, in the support unit 5 according to the present embodiment, the power rails 20 are provided directly on the bracket 12 without interposing the insulating support 21 and the insulator 22 therebetween. That is, the bracket 12 includes a power rail-support portion 20X formed integrally with the bracket 12 whilst supporting the power rails 20. Further, the bracket 12 including the power rail-support portion 20X is formed integrally of any insulating member having electrical insulation.

A cross-sectional shape of the power rail-support portion 20X is substantially formed in a triangle when viewed from the travel direction of the vehicle 100. More specifically, a size of the power rail-support portion 20X in the height direction is formed so as to gradually increase toward the bracket 12 from a tip portion of the power rail-support portion 20X in which the power rail 20 is supported.

According to such a configuration, the work of fixing the insulators 22 to the bracket 12 is eliminated, and thereby, it is possible to reduce the construction man-hours. In addition, since the number of parts is reduced, it is possible to reduce costs for quality control, inventory management, and so on.

Sixth Embodiment

Next, a sixth embodiment of the present invention will be explained with reference to FIG. 7. In addition, with respect to the same configurations as in each of the above-described embodiments, the same reference numerals are used and detailed explanations thereof are omitted.

Figure 7:
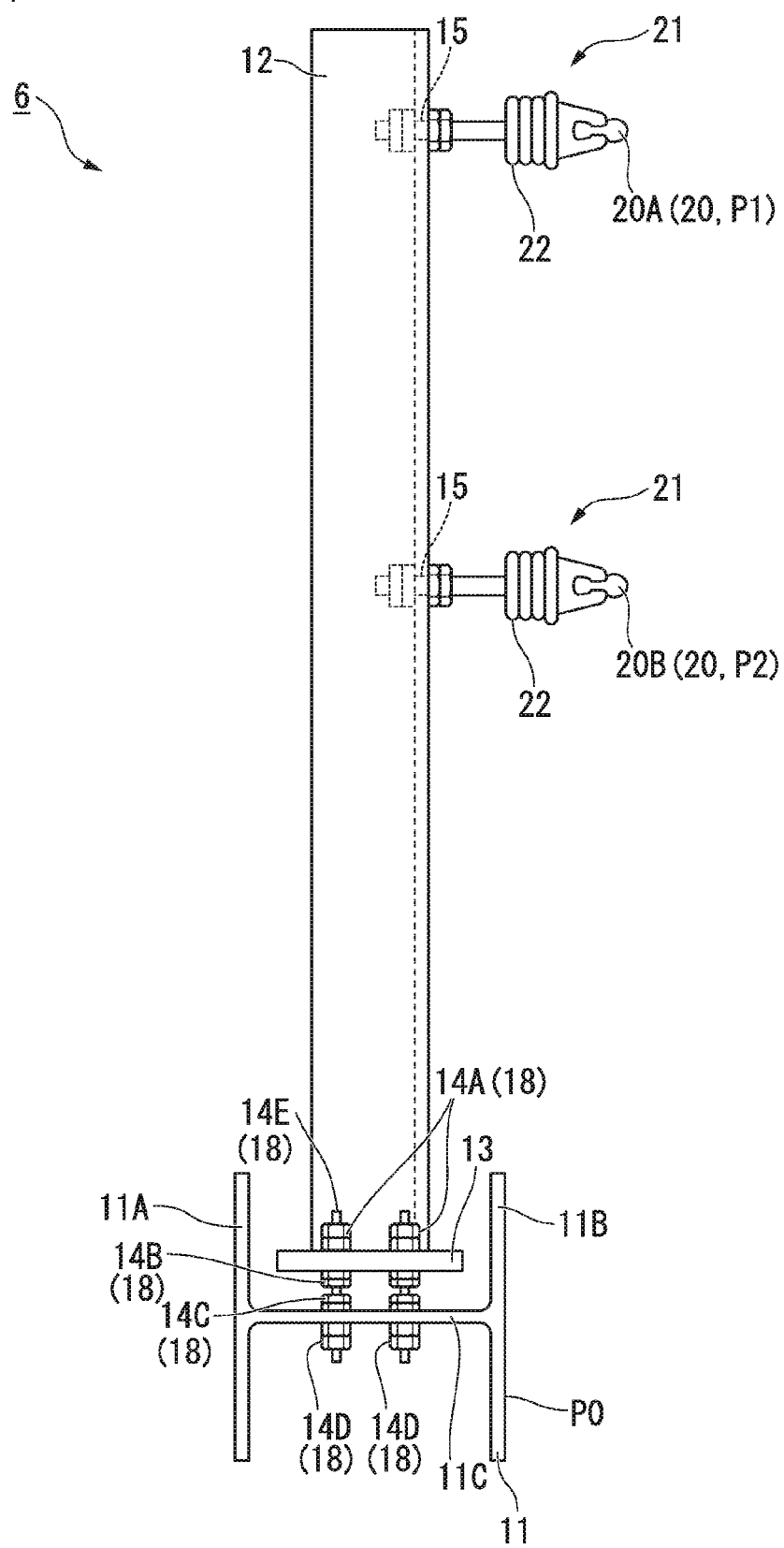
FIG. 7 is a front view of a support unit according to a sixth embodiment of the present invention.

FIG. 7 is a front view of a support unit 6 according to the present embodiment. As shown in FIG. 7, in the support unit 6 of the present embodiment, a nut portion 14A and a nut portion 14B are respectively provided at both sides of a spacer 13 of a second fixing portion 18 in the vertical direction. In addition, a nut portion 14C and a nut portion 14D are respectively provided at both sides of a connecting portion 11C in the vertical direction. Each of the nut portions 14A, 14B, 14C, 14D is fastened by passing a bolt 14E therethrough. The bolt 14E is disposed by penetrating the spacer 13 along a direction perpendicular to the spacer 13. Further, each of the nut portions 14A, 14B, 14C, 14D is constituted by two nuts, and the two nuts adjacent to each other are tightened to each other and are fixed at an arbitrary position on the bolt 14E.

Thus, by changing the fastened position of these nuts 14A, 14B, 14C, 14D relative to the bolt 14E, it is possible to finely adjust the distance between the spacer 13 and the connecting portion 11C.

Thus, according to this configuration, even when a changing request of a relative position of the power rails 20 relative to the guide rail 11 from the initial-defined position occurs, it is possible to easily accommodate this change by adjusting the fixing position of the bracket 12 relative to the guide rail 11. Accordingly, it is possible to reduce maintenance costs and man-hours after laying the guide rail 99.

Seventh Embodiment

Next, a seventh embodiment of the present invention will be explained with reference to FIG. 8. In addition, with respect to the same configurations as in each of the above-described embodiments, the same reference numerals are used and detailed explanations thereof are omitted.

Figure 8:
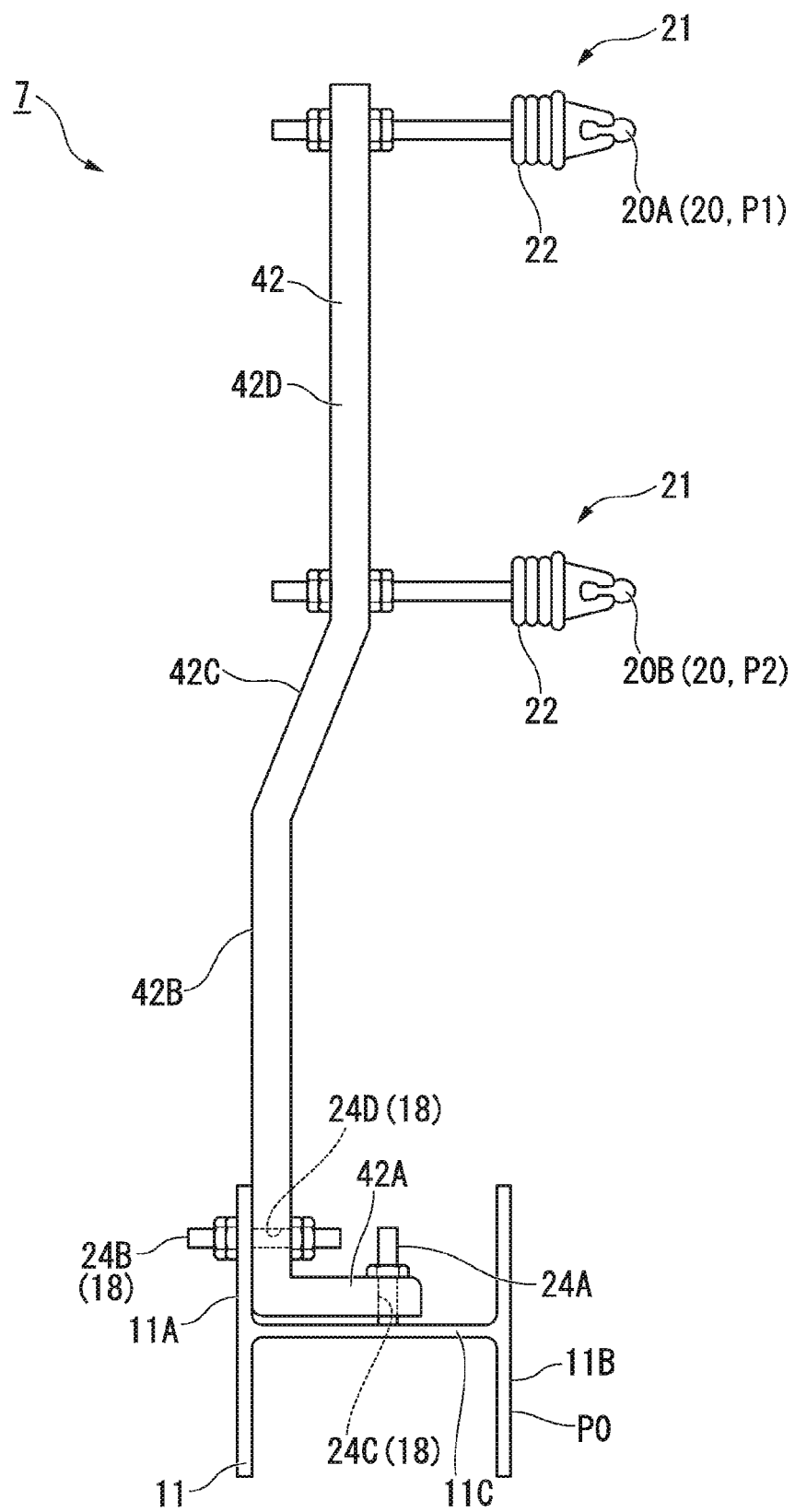
FIG. 8 is a front view of a support unit according to the seventh embodiment of the present invention.

FIG. 8 is a front view of a support unit 7 according to the present embodiment. As shown in FIG. 8, in the support unit 7 according to the present embodiment, a bracket 42 is formed in a substantially L-shape when viewed in a cross-section from the travel direction of a vehicle 100. In other words, the support unit includes a fixed portion 42A that extends substantially parallel to a connecting portion 11C of a guide rail 11, a first extending portion 42B that forms approximately a right angle with the fixed portion 42A and extends upward, a second extending portion 42D which extends along a direction parallel to the first extending portion 42B, and an inclined portion 42C that integrally connects the first extending portion 42B and the second extending portion 42D. A lower part of the first extending portion 42B is in contact with an inner surface of a first flange 11A of the guide rail 11. The second extending portion 42D is provided at a position within a plane including a lateral direction of the vehicle 100 and at the position close to a second flange 11B side of the guide rail 11. The inclined portion 42C is a member that straightly connects an upper edge of the first extending portion 42B and a lower edge of the second extended portion 42D.

The fixed portion 42A has an elongated hole 24C into which a jack bolt 24A to be described later is inserted. The elongated hole 24C penetrates the fixed portion 42A in the vertical direction and is formed in an oval shape extending along an extending direction of the fixed portion 42A. Further, the first extending portion 42B has an elongated hole 24D at a lower part thereof and into which a bolt 24B to be described later is inserted. The elongated hole 24D penetrates the first extending portion 42B in the lateral direction and is formed in an oval shape extending along a height direction of the first extending portion 42B.

In addition, the guide rail 11 according to the present embodiment has a through-hole that has a circular shape and into which the bolt 24B is inserted at a position on the first flange 11A and at the position corresponding to the elongated hole 24D described above. More particularly, the through-hole is provided to penetrate a surface located above the connecting portion 11C of the first flange 11A in the lateral direction.

According to this configuration, it is possible to finely adjust the position of the bracket 42 in the height direction by the jack bolt 24A and to finely adjust the position of the bracket 42 in the lateral direction of the vehicle 100 by the bolt 24B.

Accordingly, even when a changing request of a relative position of the power rails 20 relative to the guide rail 11 from the initial-defined position occurs, it is possible to easily accommodate this change by adjusting the fixing position of the bracket 42 relative to the guide rail 11.

Eighth Embodiment

Next, an eighth embodiment of the present invention will be explained with reference to FIG. 9. In addition, with respect to the same configurations as in each of the above-described embodiments, the same reference numerals are used and detailed explanations thereof are omitted.

Figure 9:
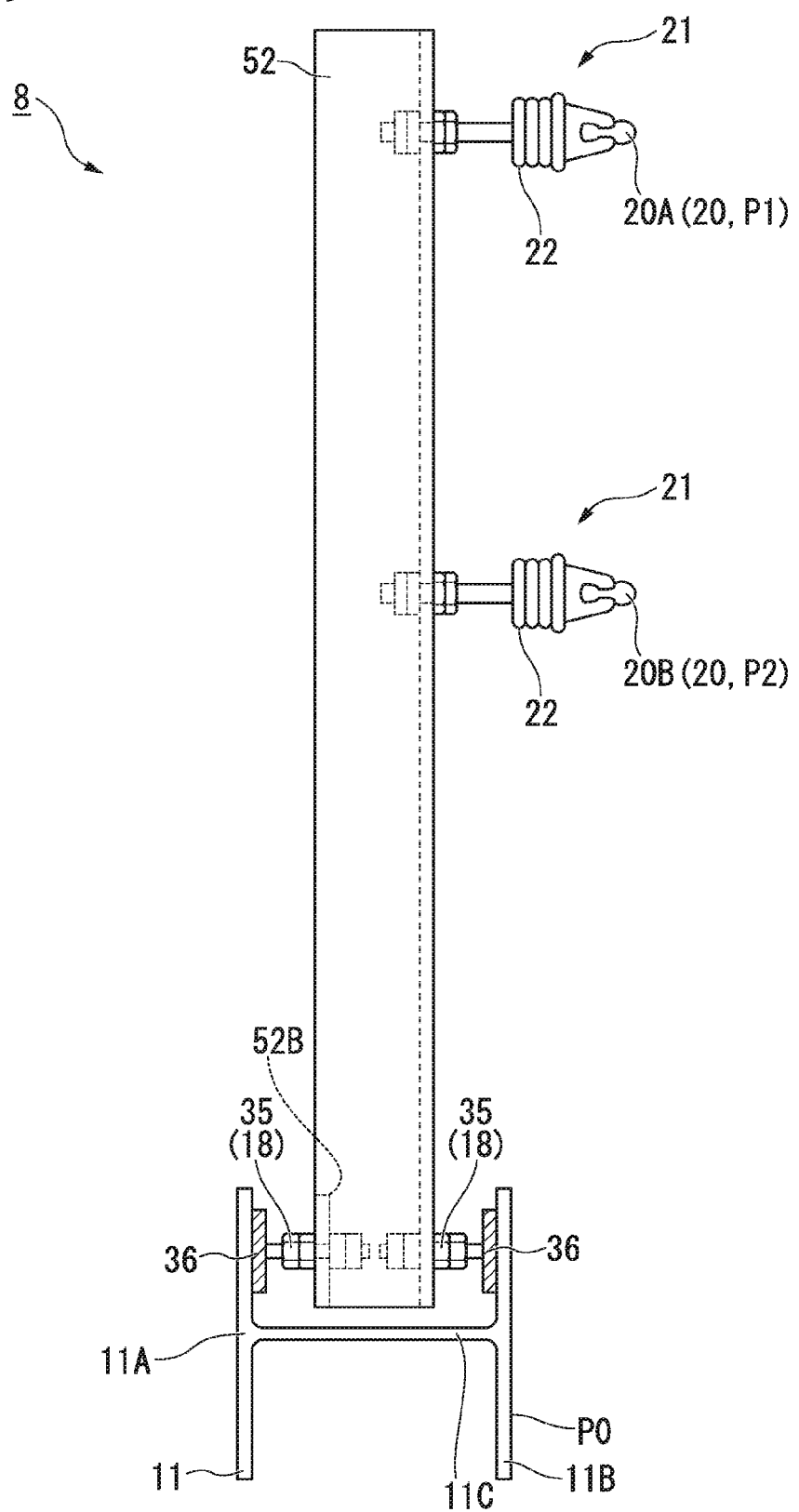
FIG. 9 is a front view of a support unit according to the eighth embodiment of the present invention.

FIG. 9 is a front view of a support unit 8 according to the present embodiment. As shown in FIG. 9, in the support unit 8 according to the present embodiment, a fixed portion 52B of the bracket 52 has a shape as described below. That is, a cross-section of the fixed portion 52B is formed in a substantially C-shape when viewed in the vertical direction. Also, a cross-section of a part located above the fixed portion 52B is formed so as to have a substantially L-shape when viewed from a vertical direction.

Further, a bracket 52 is fixed to the opposing surfaces of a first flange 11A and the second flange 11B of the guide rail 11 by a pair of bolts 35, 35, with interposed connecting members 36, 36 being formed of a high elasticity rubber, or the like. More specifically, the pair of bolts 35, 35 is fixed to the fixed portion 52B in a direction away from each other so that the pair of connecting members 36, 36 is pressed in a direction away from each other along a lateral direction. Thus, the connecting members 36, 36 are respectively pressed to the first flange 11A and the second flange 11B of the guide rail 11, and the bracket is fixed and supported so as to be incapable of falling off.

Here, with respect to the first flange 11A and the second flange 11B, the position of the bracket 52 in the height direction and the horizontal direction can be finely adjusted by appropriately changing the abutting position of the connecting members 36, 36.

Accordingly, even when a changing request of a relative position of the power rails 20 relative to the guide rail 11 from the initial defined position occurs, it can easily accommodate this change by adjusting the fixing position of the bracket 52 relative to the guide rail 11.

Ninth Embodiment

Next, a ninth embodiment of the present invention will be explained with reference to FIG. 10. In addition, with respect to the same configurations as in each of the above-described embodiments, the same reference numerals are used and detailed explanations thereof are omitted.

Figure 10:
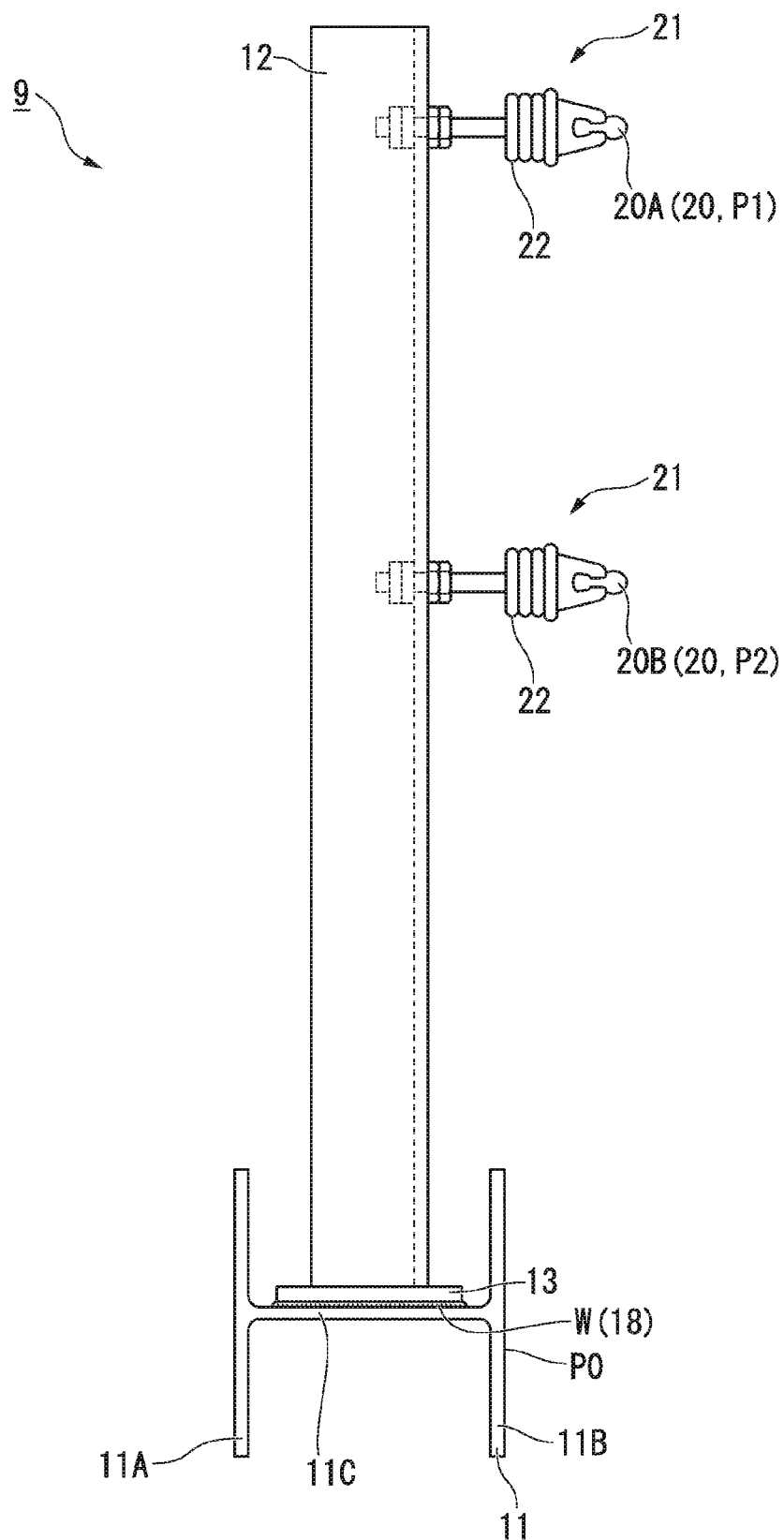
FIG. 10 is a front view of a support unit according to the ninth embodiment of the present invention.

FIG. 10 is a front view of a support unit 9 according to the present embodiment. As shown in FIG. 10, in the support unit 9 according to the present embodiment, with respect to a connecting portion 11C of a guide rail 11, a bracket 12 is fixed by a welded portion W via a spacer 13.

Accordingly, since the bracket 12 is substantially directly fixed on an upper surface of the connecting portion 11C in the guide rail 11 without interposing a fixing member such as a bolt, the possibility of causing a gap of the predetermined relative position between the guide rail 11 and the first power rail 20A and between the guide rail and the second power rail 20B is reduced. Therefore, the position of the guide rail 11, the position of the first power rail 20A, and the position of the second power rail 20B do not need to be separately adjusted and determined. Accordingly, it is possible to carry out the construction of the guide track 99 with high accuracy and to reduce the construction man-hours.

The embodiments of the present invention have been described in detail with reference to the drawings; however, the specific configuration is not limited to these embodiments, and various design modifications are included without departing from the scope of the present invention.

For example, in the embodiments described above, the power rails 20 are constituted from two power rails, namely the first power rail 20A and the second power rail 20B. However, the number of power rails 20 that is installed is not limited thereto, and it may be changed as appropriate depending on the design. For example, in a track section which is electrified by an alternating voltage, the number of the power rails 20 becomes three.

Further, in the above embodiments, examples in which the cross-section of the bracket 12 is formed in an L-shape have been described. However, the cross-sectional shape of the bracket 12 is not limited to an L-shape, and it may be, for example, an H-shape, C-shape, I-shape, and the like.

FIELD OF INDUSTRIAL APPLICATION

The above-described power rail-support unit can be applied to, for example, a guide-track transportation system. This support unit and the guide-track transportation system provided therewith can maintain high construction accuracy and can reduce construction man-hours.

The invention claimed is:

1. A power rail-support unit, comprising:
a base portion that is integrally fixed on a track;
a guide rail on which a guide wheel of a side portion of a vehicle travelling on the track abuts;
a first fixing portion that is configured to fix the guide rail on the base portion;
a second fixing portion that is connected to the guide rail so as to be independent of the first fixing portion;
a bracket that is supported on the guide rail; and
a power rail that is supported by the bracket so as to be arranged at a predetermined relative position relative to the guide rail, and that slides on and makes contact with a collector of the vehicle,
wherein the guide rail includes:
a first flange that is fixed on the base portion by the first fixing portion;
a second flange that is disposed so as to face the first flange and on which the guide wheel is in contact; and
a connecting portion that connects the first flange and the second flange between the first flange and the second flange, and
wherein the bracket includes:
a fixed portion that is fixed to the connecting portion by the second fixing portion,
an extending portion that extends in a direction away from the connecting portion and extends obliquely from a portion of the second flange side of the fixed portion toward a portion of the first flange side of the fixed portion.

2. The power rail-support unit according to claim 1, wherein
the predetermined relative position is determined based on the positional relationship between the guide wheel of lime vehicle and the power rail.

3. The power rail-support unit according to claim 1, wherein
the bracket has a cable support portion that supports a cable.

4. The power rail-support unit according to claim 1, wherein
the bracket and an insulator are integrally formed of an insulating member, and
the power rail is fixed and supported by the guide rail with the insulating member being interposed therebetween.

5. The power rail-support unit according to claim 1, wherein
the second fixing portion is configured to be capable of adjusting a fixing portion of the bracket relative to the guide rail so as to be capable of finely adjusting a fixing portion of the power rail from the relative position.

6. The power rail-support unit according to claim 1, wherein
a spacer is provided that is configured to finely adjust a fixing portion of the power rail from the relative position by being interposed between the guide rail and the bracket.

7. A guide-track transportation system, comprising:
the power rail-support unit according to claim 1; and
a vehicle.

* * * * *